(12) United States Patent
Hikmet et al.

(10) Patent No.: US 10,982,838 B2
(45) Date of Patent: Apr. 20, 2021

(54) FASTENING DEVICE AND METHOD FOR PRODUCING SUCH A FASTENING DEVICE

(71) Applicant: SIGNIFY HOLDING B.V., Eindhoven (NL)

(72) Inventors: Rifat Ata Mustafa Hikmet, Eindhoven (NL); Jacobus Petrus Johannes Van Os, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/607,400

(22) PCT Filed: Apr. 19, 2018

(86) PCT No.: PCT/EP2018/060065
§ 371 (c)(1),
(2) Date: Oct. 23, 2019

(87) PCT Pub. No.: WO2018/197336
PCT Pub. Date: Nov. 1, 2018

(65) Prior Publication Data
US 2020/0049328 A1    Feb. 13, 2020

(30) Foreign Application Priority Data
Apr. 24, 2017  (EP) .................................... 17167667

(51) Int. Cl.
*F21V 17/10* (2006.01)
*F21V 21/26* (2006.01)
(Continued)

(52) U.S. Cl.
CPC ............ *F21V 17/101* (2013.01); *B33Y 80/00* (2014.12); *F21V 21/26* (2013.01); *F21V 21/28* (2013.01);
(Continued)

(58) Field of Classification Search
CPC ........ F21V 17/101; F21V 21/26; F21V 21/30; F21V 21/29
See application file for complete search history.

(56) References Cited

U.S. PATENT DOCUMENTS 1,772,284 A * 8/1930 Johansson .......... F16M 11/2078
                                                   248/324
1,784,306 A * 12/1930 Murphy ................. F21V 21/26
                                                   362/396

(Continued)

FOREIGN PATENT DOCUMENTS

CN       202993073 U    6/2013
CN       203162843 U    8/2013
(Continued)

*Primary Examiner* — Matthew J. Peerce
(74) *Attorney, Agent, or Firm* — Daniel J. Piotrowski (57) ABSTRACT

A method of producing a fastening device, and a fastening device, is provided. The method comprises the steps of forming a body elongating along a first axis by iteratively stacking layers, wherein the body comprises an at least partially open cavity elongating along the first axis. The method further comprises the step of forming a first and second chambers in the cavity, and forming an element, of which element a first portion projects into the first chamber and of which element a third portion projects from the cavity of the body in the first plane. The element is rotatably arranged, such that upon rotation of the element, the third portion of the element is configured to be releasably wedged within the chamber.

9 Claims, 5 Drawing Sheets

(51) Int. Cl.
  *F21V 21/30*   (2006.01)
  *F21V 21/29*   (2006.01)
  *F21V 21/28*   (2006.01)
  *F21Y 115/10*  (2016.01)
  *B33Y 80/00*   (2015.01)
  *B33Y 10/00*   (2015.01)

(52) U.S. Cl.
  CPC .............. *F21V 21/29* (2013.01); *F21V 21/30* (2013.01); *B33Y 10/00* (2014.12); *F21Y 2115/10* (2016.08)

(56) References Cited

U.S. PATENT DOCUMENTS

| | | | |
|---|---|---|---|
| 2,539,974 | A | 1/1951 | Riddell |
| 4,258,414 | A * | 3/1981 | Sokol ...................... F21L 14/02 |
| | | | 362/378 |
| 6,022,119 | A | 2/2000 | Booty |
| 9,119,288 | B2 | 8/2015 | Snider et al. |
| 2010/0327479 | A1 | 12/2010 | Zinniel et al. |
| 2014/0086707 | A1 | 3/2014 | No et al. |
| 2020/0224861 | A1 * | 7/2020 | Kotovsky ............... F21S 8/063 |

FOREIGN PATENT DOCUMENTS

| | | |
|---|---|---|
| CN | 204611597 U | 9/2015 |
| CN | 205717093 U | 11/2016 |
| CN | 205957097 U | 2/2017 |
| CN | 206106602 U | 4/2017 |
| WO | 9913754 A1 | 3/1999 |

* cited by examiner

FASTENING DEVICE AND METHOD FOR PRODUCING SUCH A FASTENING DEVICE

CROSS-REFERENCE TO PRIOR APPLICATIONS

This application is the U.S. National Phase application under 35 U.S.C. § 371 of International Application No. PCT/EP2018/060065, filed on Apr. 19, 2018, which claims the benefit of European Patent Application No. 17167667.9, filed on Apr. 24, 2017. These applications are hereby incorporated by reference herein.

FIELD OF THE INVENTION

The present invention generally relates to the field of 3D printing. More specifically, the present invention relates to a fastening device, e.g. for a lighting arrangement, and a method for producing such a fastening arrangement by 3D printing.

BACKGROUND OF THE INVENTION

Additive manufacturing, sometimes also referred to as 3D printing, refers to processes used to synthesize a three-dimensional object. 3D printing is rapidly gaining popularity because of its ability to perform rapid prototyping without the need for assembly or molding techniques to form the desired article.

By using a 3D-printing apparatus, the article or object may be built in three dimensions in a number of printing steps that are usually controlled by a computer model. For example, a sliced 3D model of the object may be provided in which each slice is recreated by the 3D-printing apparatus in a discrete printing step. The 3D-printing apparatus may deposit successive layers of an extrudable material from a dispenser, and the layers may be cured or otherwise hardened after deposition, e.g. using a laser to induce the curing process. An example of such a 3D printing apparatus is disclosed in US 2010/0327479 A1.

The concept of 3D printing may be useful in many areas, wherein the production of lighting arrangements configured to be mounted on a wall and/or in a ceiling (e.g. spotlight modules) may serve as an example. In this example, a fastening device is typically used to mount the lighting arrangement on the wall or in the ceiling, preferably even in an adjustable (such as a tiltable) manner.

An example of a fastening device is disclosed in U.S. Pat. No. 2,539,974. This document discloses a flashlight having a head structure that is pivotally swingable on an end portion of a battery case. The head structure may be adjusted in such a way that the light beam produced by the flashlight can be projected into various angular directions relative to the battery case. The head structure is in the form of a substantially cylindrical barrel that is eccentrically pivoted between ears that are outwardly projecting from an end of the battery case.

It will be appreciated that a production of arrangements of this kind according to conventional methods may often render arrangements of many parts and/or that the production of the arrangements is relatively complicated. Hence, alternative solutions are of interest, e.g. by using 3D printing.

SUMMARY OF THE INVENTION

It is an object of the present invention to mitigate the above problems and to provide a fastening device and a method for producing such a fastening device by 3D printing.

This and other objects are achieved by a fastening device and a method having the features in the independent claims. Preferred embodiments are defined in the dependent claims.

Hence, according to a first aspect of the present invention, there is provided a fastening device, e.g. for a lighting arrangement. The fastening device comprises a body elongating along a first axis perpendicular to a first plane, wherein the body comprises an at least partially open cavity elongating along the first axis. The fastening device further comprises a first chamber and a second chamber arranged in the cavity, wherein the first and second chambers are adjacent to each other in the first plane (i.e. in a direction parallel to the first plane and perpendicular to the first axis). The fastening device further comprises an element arranged in the cavity and elongating in the first plane. A first portion of the element projects into the first chamber, a second portion of the element is arranged in the second chamber, and a third portion of the element projects from the cavity of the body. The element is rotatably arranged around its second portion in the second chamber, such that the second portion serves as a fulcrum for the element. Furthermore, at least one dimension of the third portion of the element is larger than a corresponding dimension of the chamber, and at least one of the third portion of the element and the chamber is resilient in the at least one dimension, such that upon rotation of the element around the second portion, the third portion of the element is configured to be releasably wedged within the first chamber.

According to a second aspect of the present invention, there is provided a method of producing a fastening device by a 3D-printing process, in which layers of printing material deposited in a first plane are iteratively stacked along a first axis, perpendicular to the first plane. The method comprises the step of forming a body elongating along the first axis by iteratively stacking layers in the first plane, wherein the body comprises an at least partially open cavity elongating along the first axis. The method further comprises the step of forming a first chamber and a second chamber in the cavity, wherein the first and second chambers are arranged adjacent to each other in the first plane (i.e. in a direction parallel to the first plane and perpendicular to the first axis). The method further comprises the step of forming an element, of which element a first portion projects into the first chamber, of which element a second portion is arranged in the second chamber, and of which element a third portion projects from the cavity of the body in the first plane. The element is rotatably arranged around its second portion in the second chamber, such that the second portion serves as a fulcrum for the element. Furthermore, at least one dimension in the first plane of the third portion of the element is larger than a corresponding dimension of the chamber, and at least one of the third portion of the element and the chamber is resilient in the at least one dimension, such that upon rotation of the element around the second portion, the third portion of the element is configured to be releasably wedged within the chamber.

Thus, the present invention is based on the idea of providing a fastening device. A hinged element of the fastening device, of which element a first portion may be coupled to a lighting device, may be conveniently wedged at an opposite end thereof within a chamber of the fastening device upon rotation of the element. In other words, the hinged element can be conveniently tilted within the fastening device, and the element may be wedged (i.e. by friction) in the chamber, such that a desired tilting angle of the element, and consequently, also of a lighting device if coupled to the element, can be obtained.

The present invention is advantageous in that the inventive arrangement of the tiltable element in the fastening device may conveniently provide a desired angle of a lighting device (e.g. a spot light) coupled to the element. Hence, the fastening device may keep the lighting device in a reliable manner in a desired position.

The present invention is further advantageous in that the fastening device, including the hinged element, may be conveniently produced by a 3D-printing process according to the second aspect of the present invention. More specifically, the method may produce the fastening device such that the element is orientated with its first portion projecting into the first chamber and its third portion projecting from the cavity of the body. Then, after production of the fastening device, the element may be conveniently rotated such that the third portion of the element is releasably wedged within the chamber, and the first portion projects from the cavity of the body.

It will be appreciated that the mentioned advantages of the printer head of the first aspect of the present invention also hold for the method according to the second aspect of the present invention.

According to the first aspect of the present invention, there is provided a fastening device. The fastening device comprises a body elongating along a first axis. It will be appreciated that the body may be U-shaped, such that the U-shape defines an at least partially open cavity elongating along the z-axis. The (U-shaped) body may constitute an oblong, tube-shaped cylinder. Alternatively, the body may have various shapes and have various cross-sections (e.g. a square cross-section). The at least partially open cavity may have the form of a slit provided in the body.

The fastening device further comprises a first chamber and a second chamber arranged in the cavity, wherein the first and second chambers are arranged next to each other in a direction parallel to the first plane and perpendicular to the first axis. The first and second chambers may constitute adjacently arranged chambers having substantially parallelepiped shapes. For example, the first chamber may be provided in a vicinity of the base of the U-shape in a cross-section of the body. Furthermore, the second chamber may be provided in a vicinity of the orifice of the U-shape of the body in the first plane. In other words, in a cross-section of the body in the first plane, the first chamber may be provided before the second chamber along a direction in the first plane from the base of the U-shape of the body towards its orifice.

The fastening device further comprises an element arranged in the cavity and elongating in the first plane perpendicular to the first axis. For example, if the first axis constitutes the z-axis, the first plane constitutes the x-y-plane. A first portion of the element projects into the first chamber, a second portion of the element is arranged in the second chamber, and a third portion of the element projects from the cavity of the body. In other words, the element is arranged at least partially within the first and second chambers.

The element is rotatably arranged around its second portion in the second chamber, such that the second portion serves as a fulcrum for the element. Hence, the element is rotatable in a second plane spanned by the first axis (e.g. the z-axis) and a vector (e.g. the x-axis) in the first plane. Hence, the element is hinged in the first plane, and the second portion of the element may be rotated in the second plane, within the second chamber.

Furthermore, at least one dimension of the third portion of the element is larger than a corresponding dimension of the chamber. In other words, the dimensions of the third portion, e.g. in a direction in the first plane, is larger than the dimension of the chamber in the corresponding direction in the first plane. Furthermore, at least one of the third portion of the element and the chamber is resilient in the mentioned at least one dimension, such that upon rotation of the element around the second portion, the third portion of the element is configured to be releasably wedged within the first chamber. In other words, either the third portion of the element or the chamber (or even a combination of the third portion of the element and the chamber) is (are) resilient in the mentioned dimension. Consequently, a rotation of the element around its second portion leads to a wedging of the third portion in the chamber, as its dimension along an axis from the second portion to the third portion is larger than the dimension of the chamber along said axis.

According to an embodiment of the present invention, the third portion comprises at least one resilient part extending in the first plane. Upon rotation of the element around the partition means, the at least one part is configured to come into abutting contact with at least a portion of the first chamber wall, whereby the at least one part is biased by the force of the at least one portion of the first chamber wall. Hence, the resilient part of the third portion of the element is configured to apply a force on the chamber wall (or vice versa). By the term "resilient part", it is here meant substantially any resilient part, portion, element, or the like, of the third portion of the element. For example, the resilient part may constitute one or more springs, leaf springs, a contractible and/or compressible structure, etc. The present embodiment is advantageous in that the resilient part of the third portion of the element may provide a relatively reliable (firm) wedging of the third portion of the element in the chamber.

According to an embodiment of the present invention, the at least one resilient part is configured to come into abutting contact with at least a portion of at least one side of the cavity at least partially defining the first chamber wall. In other words, the chamber walls of the cavity may substantially constitute a base portion and (two) side portions, and in the present embodiment, the resilient part(s) is (are) configured to come into abutting contact with (a) portion(s) of the side(s) of the cavity of the body.

According to an embodiment of the present invention, the at least one resilient part is configured to come into abutting contact with at least a portion of the base of the cavity of the body at least partially defining the first chamber wall. In other words, the chamber walls of the cavity may substantially constitute a base portion and (two) side portions, and in the present embodiment, the resilient part(s) is (are) configured to come into abutting contact with the base portion of the cavity of the body.

According to an embodiment of the present invention, the at least one resilient part comprises at least one spring element. Consequently, upon rotation of the element, the spring element(s) become biased upon wedging of the third portion of the element in the second chamber. The present embodiment is advantageous in that the provision of a spring element (e.g. a spring, leaf spring, or the like) results in a conveniently structured fastening device for a reliable wedging of the third portion of the element in the second chamber.

According to an embodiment of the present invention, at least one of the third portion of the element and a portion of the first chamber wall comprises a friction surface. In other words, the third portion of the element or a portion of the first chamber wall (or even both) may comprise a friction surface. By the term "friction surface", it is here meant substantially any surface for providing a friction between the third portion of the element and a portion of the first chamber wall, e.g. a rugged surface, a surface comprising a saw-tooth profile, etc. The present embodiment is advantageous in that the provision of a friction surface results in a conveniently structured fastening device for a reliable wedging of the third portion of the element in the second chamber.

According to an embodiment of the present invention, the element may be rotatably arranged around the first axis of the second portion. Hence, the element may, apart from its suspension in the first plane such that it is rotatable (tiltable) in the second plane, be rotated around the first axis (e.g. the z-axis). The present embodiment is advantageous in that it may provide an even more versatile fastening device. For example, a lighting device coupled to the first element may be rotatable and/or tiltable in two planes perpendicular to each other, leading to enhanced lighting possibilities.

According to an embodiment of the present invention, the first portion of the element comprises a coupling arrangement for coupling the first portion to a lighting device. The present embodiment is advantageous in that a lighting device may conveniently be attached to the element via the coupling element.

According to an embodiment of the present invention, there is provided a lighting arrangement. The lighting arrangement comprises a fastening device of any one of the preceding embodiments, and a lighting device comprising at least one light source, wherein the lighting device is coupled to the first portion of the fastening device.

According to an embodiment of the second aspect of the present invention, the method further comprises the step of forming, on the first portion of the element, a coupling arrangement for coupling the first portion to a lighting device. Furthermore, according to an embodiment of the second aspect of the present invention, the method further comprises the step of forming, on the first portion of the element, a housing for a lighting device. The embodiments are advantageous in that the 3D-printing method may conveniently print a coupling arrangement and/or a housing.

Further objectives of, features of, and advantages with, the present invention will become apparent when studying the following detailed disclosure, the drawings and the appended claims. Those skilled in the art will realize that different features of the present invention can be combined to create embodiments other than those described in the following.

BRIEF DESCRIPTION OF THE DRAWINGS

This and other aspects of the present invention will now be described in more detail, with reference to the appended drawings showing embodiment(s) of the invention.

DETAILED DESCRIPTION

Figures 1A, 1B:
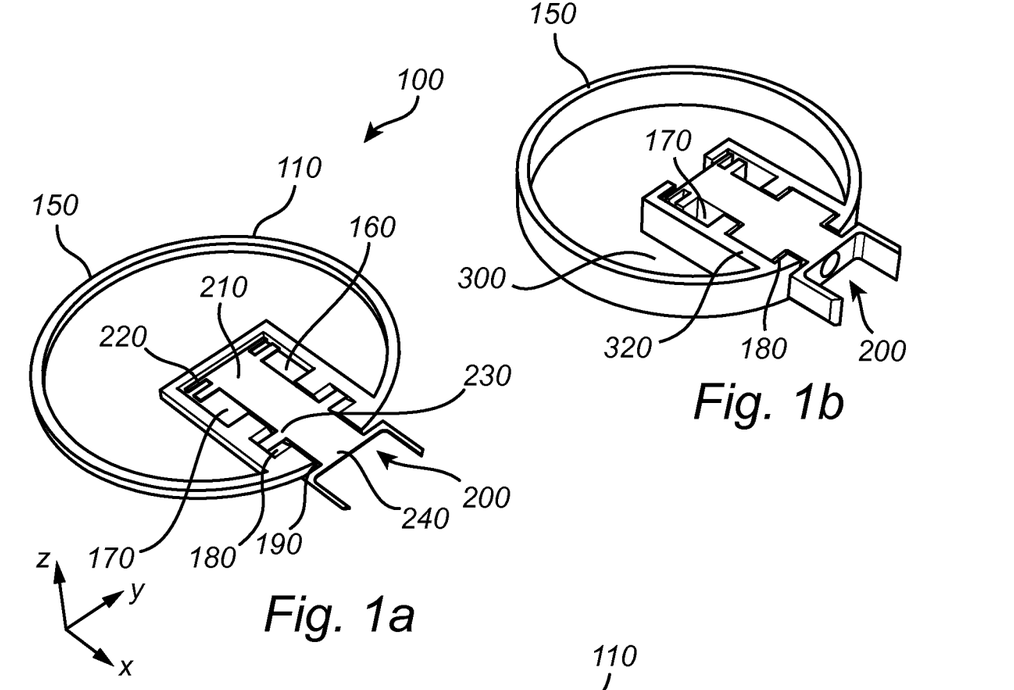
FIGS. 1a-c are schematic views of a method of producing a fastening device according to an exemplifying embodiment of the present invention.
Figure 1C:
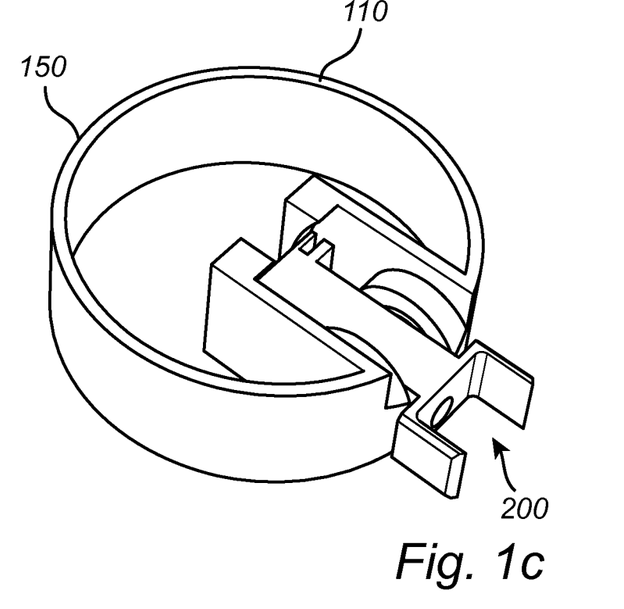

FIGS. 1a-c are schematic views of a method 100 of producing a fastening device 110 by a 3D-printing process according to a second aspect of the present invention. It should be noted that 3D-printing processes are known to the skilled person, and details thereof are hereby omitted.

By the method 100 shown in FIG. 1a, layers of printing material deposited in a first plane (i.e. the x-y-plane) are iteratively stacked along a z-axis, perpendicular to the first plane. The method 100 comprises the step of forming a body 150, e.g. in the form of a cylinder having a U-shape in its cross-section. The body 150 may elongate along the z-axis by iteratively stacking layers (e.g. having a U-shape), such that the body 150 comprises an at least partially open cavity 160 elongating along the z-axis. Here, the base of the cavity 160 is provided in a vicinity of the center of the body 150.

The method 100 further comprises the step of forming a first chamber 170 and a second chamber 180 in the cavity, wherein the first chamber 170 and the second chamber 180 are arranged adjacent to each other in a direction parallel to the first plane, and they extend in parallel along the z-axis. The first chamber 170 is provided in a vicinity of the base of the U-shape of the body 150 in the first plane, whereas the second chamber 180 is provided in a vicinity of the orifice 190 of the U-shape of the body 150 in the first plane. The shapes of the first chamber 170 and the second chamber 180, in the first plane, are rectangular, but will be appreciated that the first 170 and second 180 chambers may take on substantially any shape.

The method 100 further comprises the step of forming an element 200. A first portion 210 of the element 200 projects into the first chamber 170, and has a T-shape. In this exemplifying embodiment, the first portion 210 further comprises a coupling arrangement 220 for coupling the first portion 210 to a lighting device. It will be appreciated that the dimensions of the first portion 210 are smaller than the dimensions of the first chamber 170 in the first plane.

Furthermore, a second portion 230 of the element 200 is arranged in the second chamber 180 of the fastening device 110. Moreover, a third portion 240 of the element 200 projects from the orifice 190 of the U-shape of the body 150 in the first plane. In this exemplifying embodiment, the third portion 240 comprises two flanges, such that the third portion 240 has the shape of a staple.

FIG. 1b shows a stage of the method 100 in which more layers of printing material have been deposited in the x-y-plane and have been stacked along the z-axis, compared to FIG. 1a. Here, the body 150 defines a space 300. The element 200 projects into the space 300 and is defined by a partition wall 320. The partition wall 320, in its turn, defines the first 170 and second 180 chambers of the fastening device 110.

FIG. 1c shows an example of a fastening device 110 produced by the method 100. Compared to FIGS. 1a-b, the edge of the body 150 of the fastening device 110 is relatively high, and the forming of the element 200 has been completed.

Figure 2A:
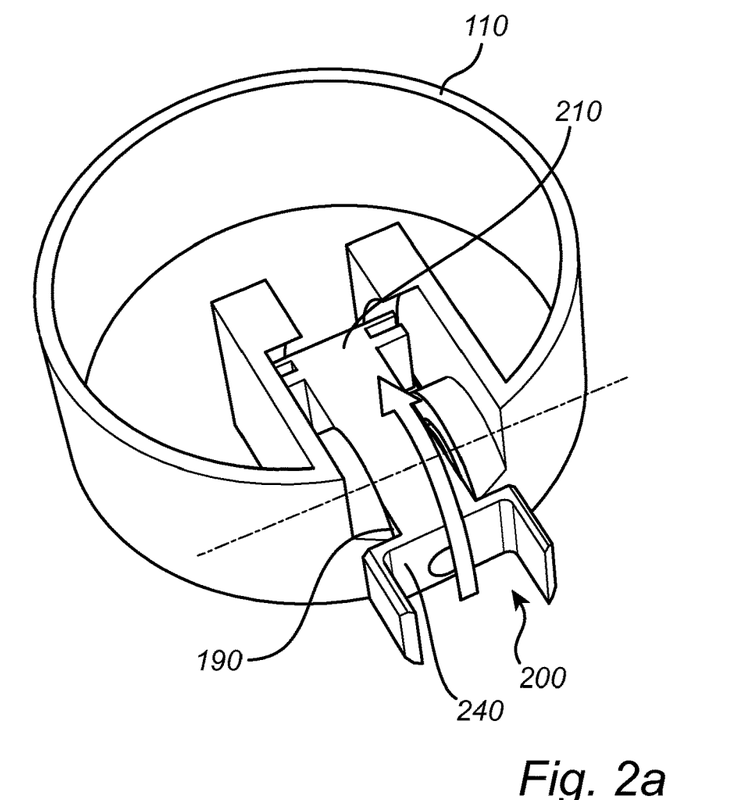
FIGS. 2a-b, FIGS. 3a-b, FIGS. 4a-b and FIGS. 5a-b are schematic views of a fastening device according to exemplifying embodiments of the present invention.
Figure 2B:
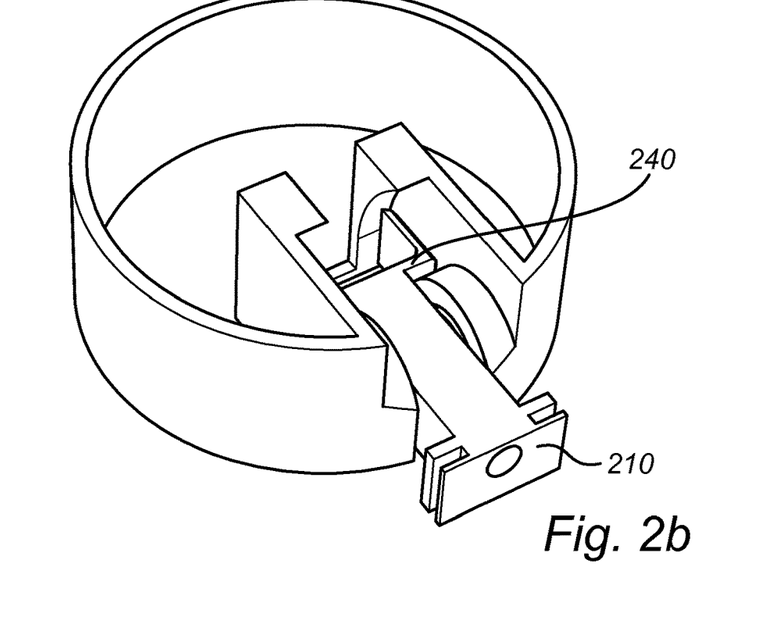

FIGS. 2a-b are schematic views of a fastening device 110 according to an exemplifying embodiment of the present invention. In FIG. 2a, the first portion 210 of the element 200 projects into the first chamber, and the third portion 240 of the element 200 projects from the orifice 190 of the cavity of the body. In this exemplifying embodiment, the third portion 240 comprises two flanges, such that the third portion 240 has the shape of a staple. In FIG. 2b, the element 200 has been rotated 180° around the y-axis and around the second portion of the fastening device 110 compared to the (non-rotated) state of the fastening device 110 in FIG. 2a. Hence, in FIG. 2b, the third portion 240 of the element 200 is releasably wedged within the first chamber, whereas the first portion 210 projects from the orifice of the cavity of the body.

Figure 3A:
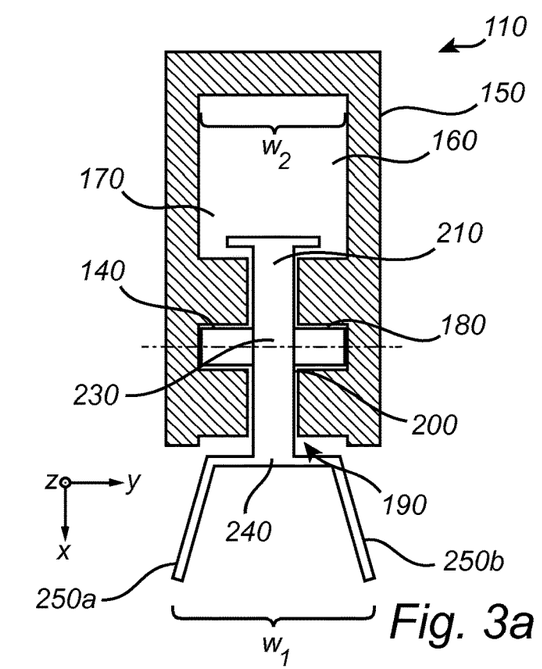

FIG. 3a schematically shows a fastening device 110, e.g. for a lighting arrangement. The fastening device 110 comprises a body 150, here in the form of a cylinder having a U-shape in its cross section. The body elongates along a z-axis, wherein the body 150 comprises an at least partially open cavity 160 elongating along the z-axis. The fastening device 110 further comprises a first chamber 170 and a second chamber 180 arranged in the cavity 160. The first 170 and second 180 chambers extend in parallel along the z-axis and they are adjacently arranged in a direction perpendicular to the z-axis. The first chamber 170 is provided in a vicinity of the base of the U-shape of the body 150, and the second chamber 180 is provided in a vicinity of the orifice 190 of the U-shape of the body 150. An element 200 is arranged in the cavity 160, elongating along the x-axis. A T-shaped first portion 210 of the element 200 projects into the first chamber 170. Furthermore, a second portion 230 of the element 200 is arranged in the second chamber 180, and a third portion 240 projects from the orifice 190 of the U-shape of the body 150. Here, the third portion 240 comprises a cup-shape or (flange) elements 250a, 250b, projecting in the x-y-plane.

The second portion 230 may act as a fulcrum around which the element 200 is rotatably arranged. Hence, for the fastening device 110 as exemplified, the element 200 is rotatable around the y-axis. It will be appreciated that at least one dimension of the third portion 240 of the element 200 is larger than a corresponding dimension of the first chamber 170. Hence, in the exemplifying embodiment of the fastening device 110 in FIG. 3a, the elements 250a, 250b define a width $w_1$ in the y-direction which is wider than a width $w_2$ of the first chamber 170. However, at least one of the third portion 240 of the element 200 and the first chamber 170 is resilient in the at least one dimension. In FIG. 3a, this is exemplified by the elements 250a, 250b, being resilient in the y-direction.

Figure 3B:
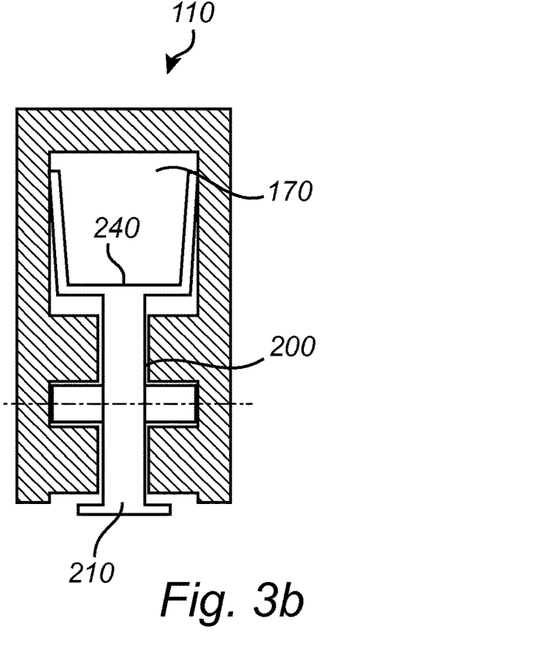

FIG. 3b shows a 180° rotation, around the y-axis, of the element 200 around the second portion 230 of the fastening device 110. Here, the third portion 240 of the element 200 is releasably wedged within the first chamber 170. As the third portion 240, in virtue of its cup-shaped elements 250a, 250b, is wider in the y-direction than the first chamber 170, but, at the same time, resilient in the y-direction, the third portion 240 is clamped in the first chamber 170 such that the element 200 may be fixed in a desired position and/or orientation. It will be appreciated that the third portion 240 and/or a portion of the wall of the first chamber 170 may comprise a rugged surface, a surface comprising a saw-tooth profile, etc. Consequently, the friction between the third portion 240 and the wall of the first chamber 170 may be improved, thereby providing a more reliable wedging of the third portion 240 of the element in the first chamber 170.

Figures 4A, 4B:
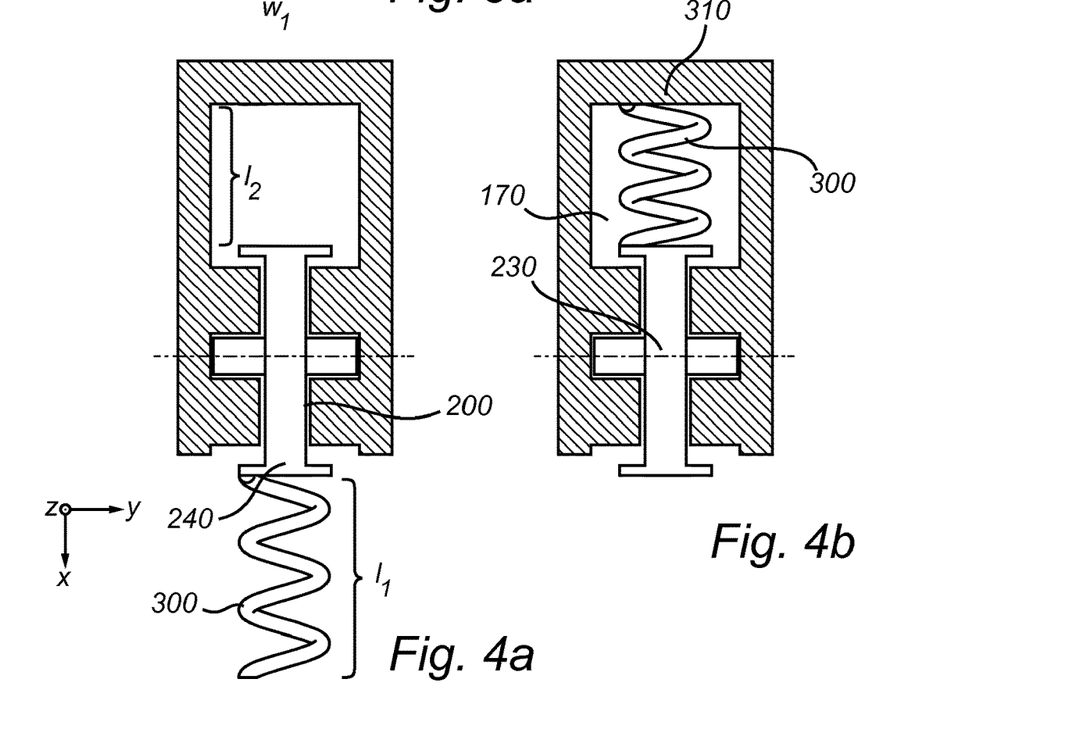

FIG. 4a schematically shows a fastening device 110 for a lighting arrangement according to an exemplifying embodiment. It will be appreciated that several references have been omitted for reasons of simplicity, and it is referred to FIG. 3a. In FIG. 4a, the third portion 240 comprises a spring element 300 extending in the x-direction. In the exemplifying embodiment of the fastening device 110, the spring element 300 defines a length $l_1$ in the x-direction which is longer than a length $l_2$ of the first chamber 170.

FIG. 4b shows a 180° rotation, around the y-axis, of the element 200 around the second portion 230 of the fastening device 110. Upon rotation of the element 200 around the second portion 230, the spring element 300 is configured to come into abutting contact with at least a portion 310 of the wall of the first chamber 170. As the length $l_1$ of the spring element 300 in the y-direction is longer than the length $l_2$ of the first chamber 170, the resilient spring element 300 becomes biased by the force of the portion 310 of the first chamber wall.

Figure 5A:
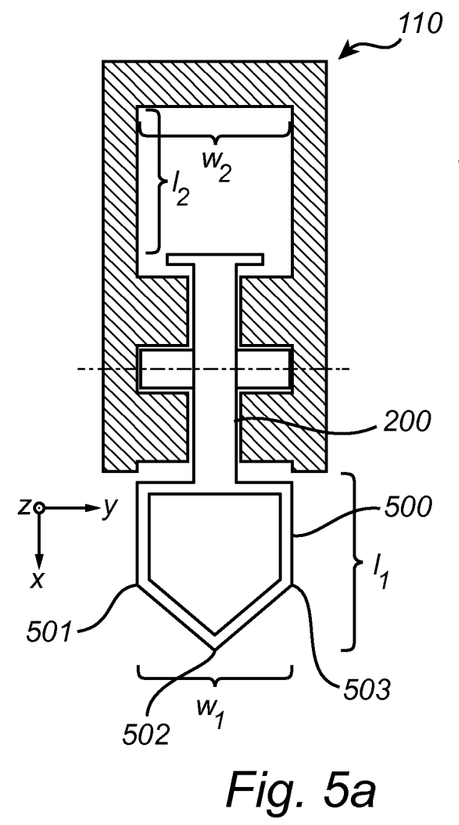

FIG. 5a schematically shows a fastening device 110 for a lighting arrangement similar to that as exemplified in FIGS. 4a-b. In this exemplifying embodiment, the cross-section of the resilient part 500 is shaped as a pentagon, comprising side edges 501, 503 and top edge 502. The resilient part 500 defines a width $w_1$ in the y-direction which is wider than a width $w_2$ of the first chamber 170. Furthermore, the length $l_1$ of the resilient part 500 in the x-direction is longer than the length $l_2$ of the first chamber 170.

Figure 5B:
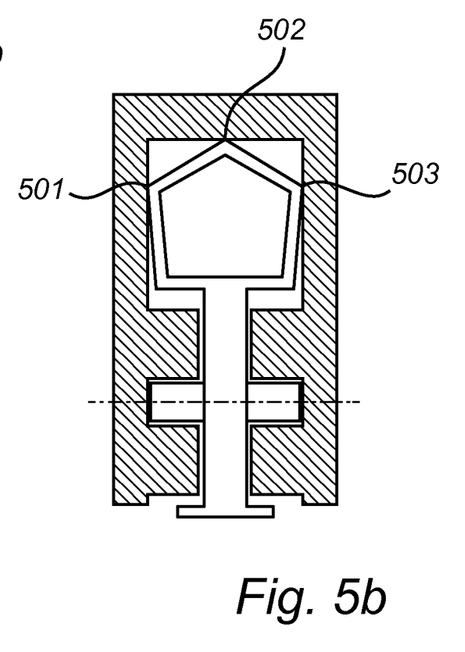

FIG. 5b shows a 180° rotation, around the y-axis, of the element 200 around the second portion 230 of the fastening device 110. Upon rotation of the element 200 around the second portion 230, the side edges 501, 503 of the resilient part 500 are configured to come into abutting contact with the respective sides of the body at least partially defining the first chamber wall. Furthermore, the top edge 502 of the resilient part 500 is configured to come into abutting contact with a portion of the base of the body at least partially defining the first chamber wall. As the length $l_1$ of the resilient part 500 in the x-direction is longer than the length $l_2$ of the first chamber 170, and as the width $w_1$ of the resilient part 500 in the y-direction which is wider than a width $w_2$ of the first chamber 170, the resilient part 500 becomes biased by the force from the first chamber wall.

Figure 6:
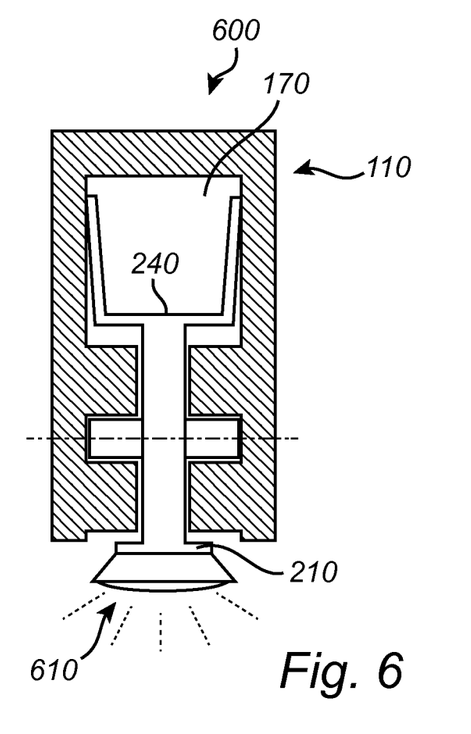
FIG. 6 is a schematic view of a lighting arrangement according to an exemplifying embodiment of the present invention.

FIG. 6 is a schematic view of a lighting arrangement 600 according to an exemplifying embodiment of the present invention. The lighting arrangement 600 comprises a fastening device 110 of any one of the preceding embodiments. The third portion 240 of the element 200 is releasably wedged within the first chamber 170, whereas the first portion 210 projects from the orifice of the cavity of the body. Furthermore, the lighting arrangement 600 comprises a lighting device 610, which in turn comprises at least one light source, e.g. one or more LEDs. The lighting device 610 is coupled to the first portion 210 of the fastening device 110.

Figure 7:
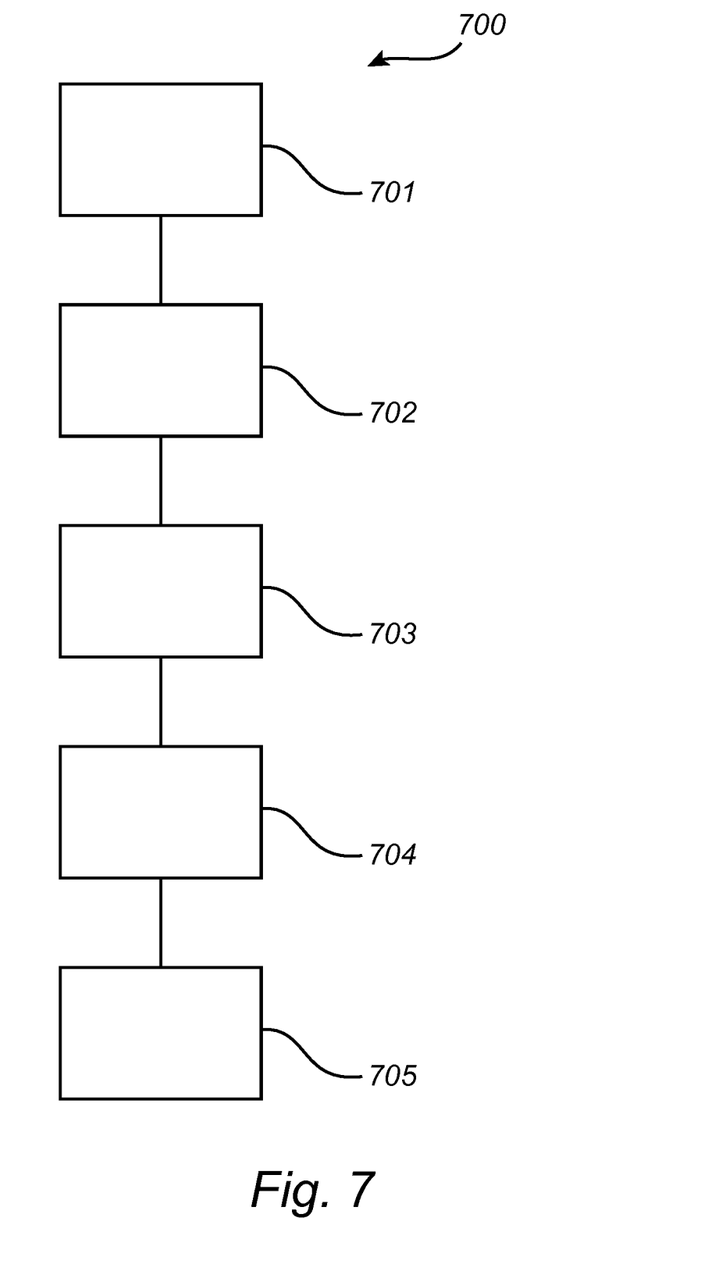
FIG. 7 is a schematic flow chart diagram of a method of producing a fastening device according to an exemplifying embodiment of the present invention.

FIG. 7 is a schematic flow chart diagram of a method 700 of producing a fastening device according to an exemplifying embodiment of the present invention. More specifically, the method 700 relates to a production of a fastening device by a 3D-printing process, in which layers of printing material deposited in a first plane are iteratively stacked along a first axis (e.g. the z-axis), perpendicular to the first plane. The method 700 comprises the step of forming 701 a (U-shaped) body elongating along the z-axis by iteratively stacking layers having a U-shape in the first plane, such that the body comprises an at least partially open cavity elongating along the z-axis. The method further comprises the step of forming 702 a first chamber and a second chamber in the cavity, wherein the first and second chambers extend in parallel along the z-axis and are arranged adjacent to each other in a direction perpendicular to the z-axis (i.e. in a direction parallel to the first plane). The first chamber is provided in a vicinity of the base of the U-shape of the body in the first plane, and the second chamber is provided in a vicinity of the orifice of the U-shape of the body in the first plane. The method further comprises the step of forming 703 an element, of which element a first portion projects into the first chamber, of which element a second portion is arranged in the second chamber, and of which element a third portion projects from the orifice of the U-shape of the body in the first plane. The element is rotatably arranged around its second portion in the second chamber, such that the second portion serves as a fulcrum for the element. Furthermore, at least one dimension in the first plane of the third portion of the element is larger than a corresponding dimension of the chamber, and at least one of the third portion of the element and the chamber is resilient in the at least one dimension, such that upon rotation of the element around the second portion, the third portion of the element is configured to be releasably wedged within the chamber.

Optionally, it will be appreciated that the method 700 may further comprise the step of forming 704, on the first portion of the element, a coupling arrangement for coupling the first portion to a lighting device and/or forming 705, on the first portion of the element, a housing for a lighting device.

The person skilled in the art realizes that the present invention by no means is limited to the preferred embodiments described above. On the contrary, many modifications and variations are possible within the scope of the appended claims. For example, it will be appreciated that the figures are merely schematic views of fastening devices according to embodiments of the present invention. Hence, any elements/components of the fastening device such as the element 200, the first chamber 170, the second chamber 180, etc., may have different dimensions, shapes and/or sizes than those depicted and/or described. For example, the mentioned elements/components may be larger or smaller than what is exemplified in the figures.

The invention claimed is:

1. A fastening device, comprising
a body elongating along a first axis perpendicular to a first plane, wherein the body comprises an at least partially open cavity elongating along the first axis,
a first chamber and a second chamber arranged in the cavity and adjacent to each other in the first plane, and
an element arranged in the cavity and elongating in the first plane,
wherein the element comprises a first portion that projects into the first chamber, a second portion that is arranged in the second chamber, and a third portion that projects from the cavity of the body,
wherein the element further is rotatably arranged around its second portion in the second chamber, such that the second portion serves as a fulcrum for the element,
wherein at least one dimension of the third portion of the element is larger than a corresponding dimension of the first chamber, and
wherein at least one of the third portion of the element and the first chamber is resilient in the at least one dimension, such that upon rotation of the element around the second portion, the third portion of the element is configured to be releasably wedged within the first chamber.

2. The fastening device of claim 1, wherein the third portion comprises at least one resilient part extending in the first plane such that upon rotation of the element around the partition means, the at least one part is configured to come into abutting contact with at least a portion of the first chamber wall, whereby the at least one part is biased by the force of the at least one portion of the first chamber wall.

3. The fastening device of claim 2, wherein the at least one resilient part is configured to come into abutting contact with at least a portion of at least one side of the cavity at least partially defining the first chamber wall.

4. The fastening device of claim 2, wherein the at least one resilient part is configured to come into abutting contact with at least a portion of the base of the cavity of the body at least partially defining the first chamber wall.

5. The fastening device of claim 2, wherein the at least one resilient part comprises at least one spring element.

6. The fastening device of claim 1, wherein at least one of the third portion of the element and a portion of the first chamber wall comprises a friction surface.

7. The fastening device of claim 1, wherein the element further is rotatably arranged around the first axis of the second portion.

8. The fastening device of claim 1, wherein the first portion of the element comprises a coupling arrangement for coupling the first portion to a lighting device.

9. A lighting arrangement, comprising
a fastening device of claim 1, and
a lighting device comprising at least one light source, wherein the lighting device is coupled to the first portion of the fastening device.

* * * * *